(12) United States Patent
Moore

(10) Patent No.: US 12,427,940 B2
(45) Date of Patent: Sep. 30, 2025

(54) DOCK BUMPER WITH INTEGRAL LAMP CLEARANCE

(71) Applicant: STI Holdings, Inc., Stoughton, WI (US)

(72) Inventor: Steven Paul Moore, Oregon, WI (US)

(73) Assignee: STI Holdings, Inc., Stoughton, WI (US)

( * ) Notice: Subject to any disclaimer, the term of this patent is extended or adjusted under 35 U.S.C. 154(b) by 475 days.

(21) Appl. No.: 17/888,923

(22) Filed: Aug. 16, 2022

(65) Prior Publication Data

US 2023/0056512 A1 Feb. 23, 2023

Related U.S. Application Data

(60) Provisional application No. 63/234,865, filed on Aug. 19, 2021.

(51) Int. Cl.
   *B60R 19/02* (2006.01)
   *B65G 69/00* (2006.01)

(52) U.S. Cl.
   CPC .......... *B60R 19/023* (2013.01); *B65G 69/001* (2013.01); *B60R 2019/026* (2013.01)

(58) Field of Classification Search
   CPC ...... B60Q 1/3015; B60Q 1/0005; B60Q 1/32; B60Q 1/34; B60Q 1/38; B60Q 1/30; B60R 2019/505; B60R 2019/026; B60R 19/023; B60R 19/02
   USPC ............... 296/193.09, 193.11; 293/102, 117; 362/543, 485
   See application file for complete search history.

(56) References Cited

U.S. PATENT DOCUMENTS

| | | | |
|---|---|---|---|
| 1,572,024 A * | 2/1926 | Macinnes | B60Q 1/2615 362/505 |
| 2,022,349 A | 11/1935 | Howard | |
| 2,730,396 A | 1/1956 | Johnson | |
| 3,639,748 A | 2/1972 | Pearson et al. | |
| 3,744,835 A | 7/1973 | Carbone et al. | |
| 5,060,122 A | 10/1991 | Miyoshi | |

(Continued)

FOREIGN PATENT DOCUMENTS

CN 112550496 * 3/2021

OTHER PUBLICATIONS

4 State Trucks, "Stainless Rear Frame Cover for Steel Crossmembers W/ Cutouts For Peterbilt 377, 378, 388, 389," <https://www.4statetrucks.com/stainless-rear-frame-cover-for-steel-crossmember-w-cutouts> web page visited Feb. 16, 2024 (4 pages).

(Continued)

*Primary Examiner* — Joseph D. Pape
(74) *Attorney, Agent, or Firm* — Michael Best & Friedrich LLP

(57) ABSTRACT

A cargo vehicle includes a cargo area configured to receive a load of cargo for transport, and a plurality of wheels configured to support the cargo area above a road surface while the plurality of wheels roll along the road surface. A rear structure of the cargo vehicle includes a rear cross member located at a rear edge of the cargo area, and a first light array is located in the rear cross member. A first dock bumper is placed directly over a first lamp of the first light array on a first lateral side of the rear cross member, the first dock bumper including a through hole accommodating the first lamp to visually mark a first outboard edge of the cargo vehicle.

20 Claims, 7 Drawing Sheets

(56) References Cited

U.S. PATENT DOCUMENTS

| | | | |
|---|---|---|---|
| 5,073,768 A * | 12/1991 | Willaredt | B60Q 1/3015 |
| | | | 340/475 |
| 6,095,074 A | 8/2000 | Reinhardt | |
| 6,133,851 A | 10/2000 | Johnson | |
| 6,461,028 B1 | 10/2002 | Huang | |
| 7,306,267 B2 * | 12/2007 | Senn | E05C 9/22 |
| | | | 292/DIG. 32 |
| 7,401,949 B2 | 7/2008 | Tufte | |
| 7,834,750 B1 | 11/2010 | Hertz et al. | |
| 8,277,098 B2 | 10/2012 | Ortwein et al. | |
| 8,562,019 B2 | 10/2013 | Ehrlich | |
| D790,407 S | 6/2017 | Miller et al. | |
| 9,840,820 B2 | 12/2017 | Taylor | |
| 9,914,389 B2 * | 3/2018 | Ehrlich | B60Q 1/263 |
| 10,369,949 B2 * | 8/2019 | Miller | B60R 19/24 |
| 10,696,256 B2 | 6/2020 | Krensky | |
| 10,814,458 B2 | 10/2020 | Maubach | |
| 10,919,441 B1 * | 2/2021 | Thompson | B60Q 1/247 |
| D911,912 S | 3/2021 | Fenton et al. | |
| 11,072,369 B2 | 7/2021 | Fenton et al. | |
| 11,110,972 B2 | 9/2021 | Fenton | |
| 11,884,333 B2 | 1/2024 | Bykovskyi et al. | |
| D1,013,579 S | 2/2024 | Miller et al. | |
| 11,964,704 B2 | 4/2024 | Fenton | |
| 11,975,767 B2 | 5/2024 | Fenton | |
| 12,344,158 B1 | 7/2025 | Ewing | |
| 2006/0130727 A1 | 6/2006 | Eischeid | |
| 2010/0202150 A1 | 8/2010 | Adams | |
| 2012/0250340 A1 * | 10/2012 | Nichols | F21V 15/005 |
| | | | 362/549 |
| 2018/0194271 A1 * | 7/2018 | Eboli, Jr. | F21S 45/10 |
| 2022/0017156 A1 | 1/2022 | Fenton | |
| 2024/0101197 A1 | 3/2024 | Bykovskyi et al. | |

OTHER PUBLICATIONS

4 State Trucks, "CSM Stainless Steel 96 Inch Full Rear Light Bar W/ Light Hole Options," <https://www.4statetrucks.com/csm-stainless-steel-96-inch-full-rear-light-bar-w-light-hole-options-ppr_205740> web page visited Feb. 16, 2024 (4 pages).

* cited by examiner

DOCK BUMPER WITH INTEGRAL LAMP CLEARANCE

CROSS-REFERENCE TO RELATED APPLICATIONS

This application claims priority to U.S. Provisional Patent Application No. 63/234,865, filed on Aug. 19, 2021, the entire contents of which are incorporated by reference herein.

BACKGROUND

The present invention relates to commercial cargo vehicles. Commercial cargo vehicles are often provided with a rear structure designed for contact with a loading dock. In addition to lighting required for over-the-road travel, the rear structure of the commercial cargo vehicle can include dock bumpers (e.g., rubber) configured to absorb impacts with the loading dock and protect other portions of the rear structure from damage. Current dock bumpers have solid surfaces with 2 to 4 mounting holes molded into them to attach to the rear cross member or bolster.

SUMMARY

In one aspect, the invention provides a cargo vehicle including a cargo area configured to receive a load of cargo for transport, and a plurality of wheels configured to support the cargo area above a road surface while the plurality of wheels roll along the road surface. A rear structure of the cargo vehicle includes a rear cross member located at a rear edge of the cargo area, and a first light array is located in the rear cross member. A first dock bumper is placed directly over a first lamp of the first light array on a first lateral side of the rear cross member, the first dock bumper including a through hole accommodating the first lamp to visually mark a first outboard edge of the cargo vehicle.

In another aspect, the invention provides a cargo vehicle including a cargo area configured to receive a load of cargo for transport, and a plurality of wheels configured to support the cargo area above a road surface while the plurality of wheels roll along the road surface. A rear structure of the cargo vehicle includes a rear cross member located at a rear edge of the cargo area. A first dock bumper is placed within 6 inches of a left outboard edge of the cargo vehicle, and a first clearance lamp is positioned within an outer profile of the first dock bumper when viewed from the rear of the cargo vehicle. A second dock bumper is placed within 6 inches of a right outboard edge of the cargo vehicle, and a second clearance lamp positioned within an outer profile of the second dock bumper as viewed from the rear of the cargo vehicle. A rear impact guard extends downward from and is mounted to the rear cross member. The first and second dock bumpers are mounted, respectively, directly above mounting portions of the rear impact guard that are secured to the rear cross member.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

Figure 1:
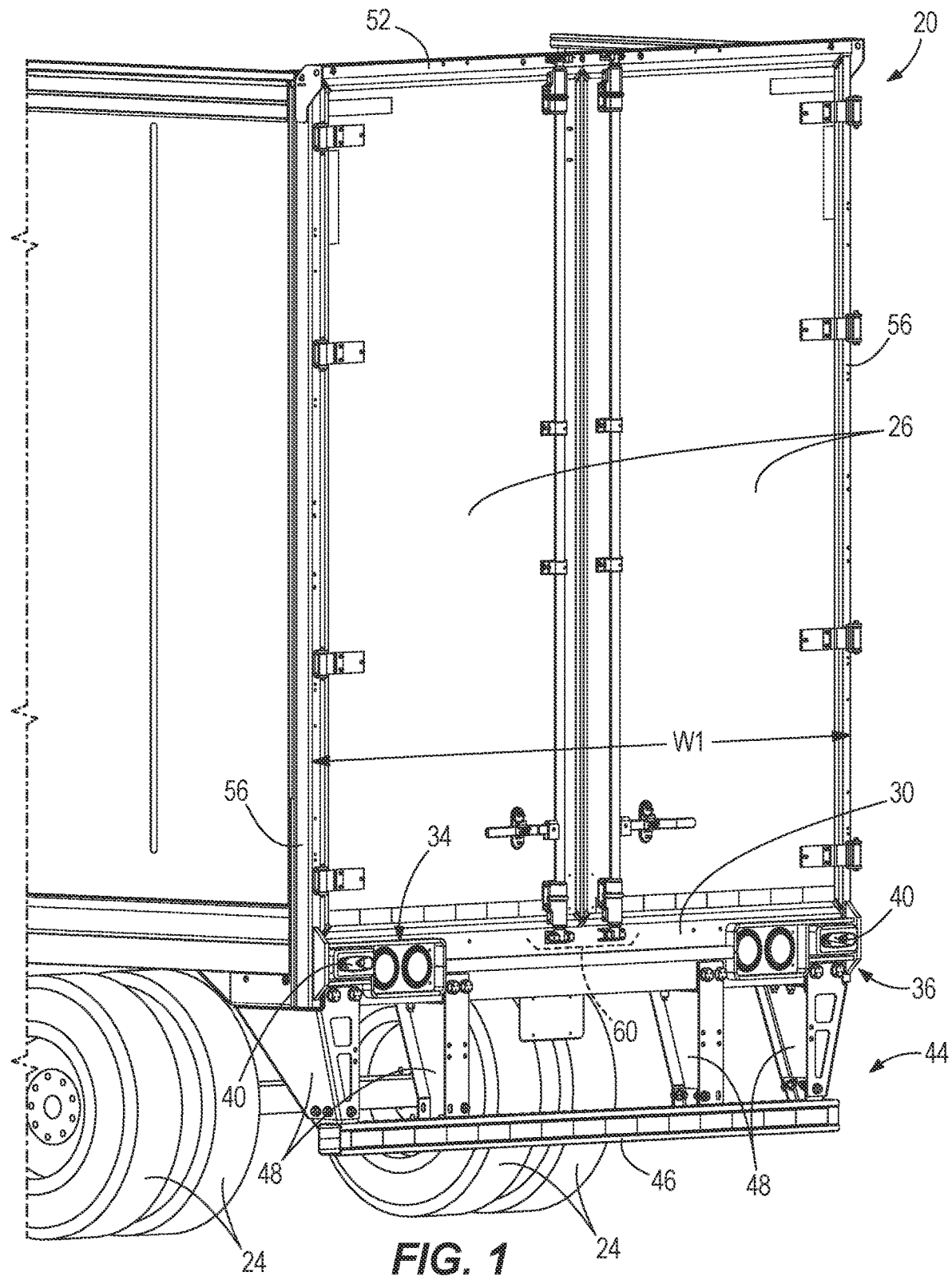
FIG. 1 is a perspective view of a rear portion of a cargo vehicle according to one embodiment of the present disclosure.

FIG. 1 illustrates a cargo vehicle 20 according to one embodiment of the present disclosure. The cargo vehicle 20 can be a semi-trailer configured for over-the-road transport when connected to a road tractor. Embodied as a trailer, the cargo vehicle 20 can be a dry van as shown, or alternately a flatbed, or a temperature-controlled "reefer" in some examples. In other constructions, the cargo vehicle 20 is a straight truck rather than a trailer that separates from a road tractor. The cargo vehicle has a cargo-receiving load floor (not shown) elevated above the road surface when conveyed along the road surface by one or more sets of wheels 24 on one or more axles. At the rear of the cargo vehicle 20 (except in the case of a flatbed), one or more doors 26 provide selective access to the cargo area. The doors 26 have respective bottom edges positioned at the elevation of the cargo load floor. The bottom edges of the doors 26 are also positioned along an upper edge of a rear cross member 30 or "rear bolster." The rear cross member 30 supports left and right arrays of lights 34, 36 as well as a pair of dock bumpers 40.

Figure 2:
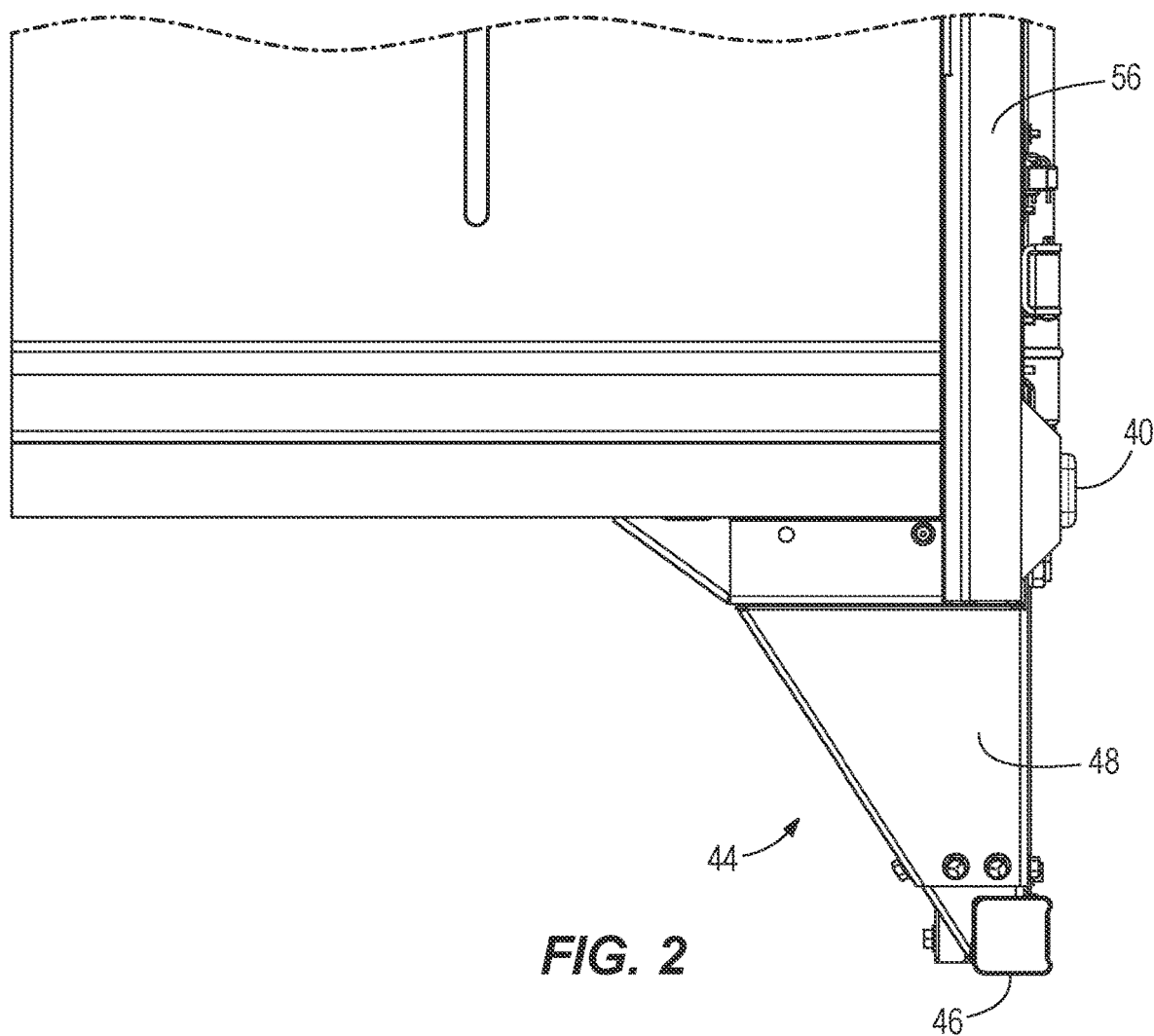
FIG. 2 is a road side elevation view of the rear portion of the cargo vehicle of FIG. 1.
Figure 3:
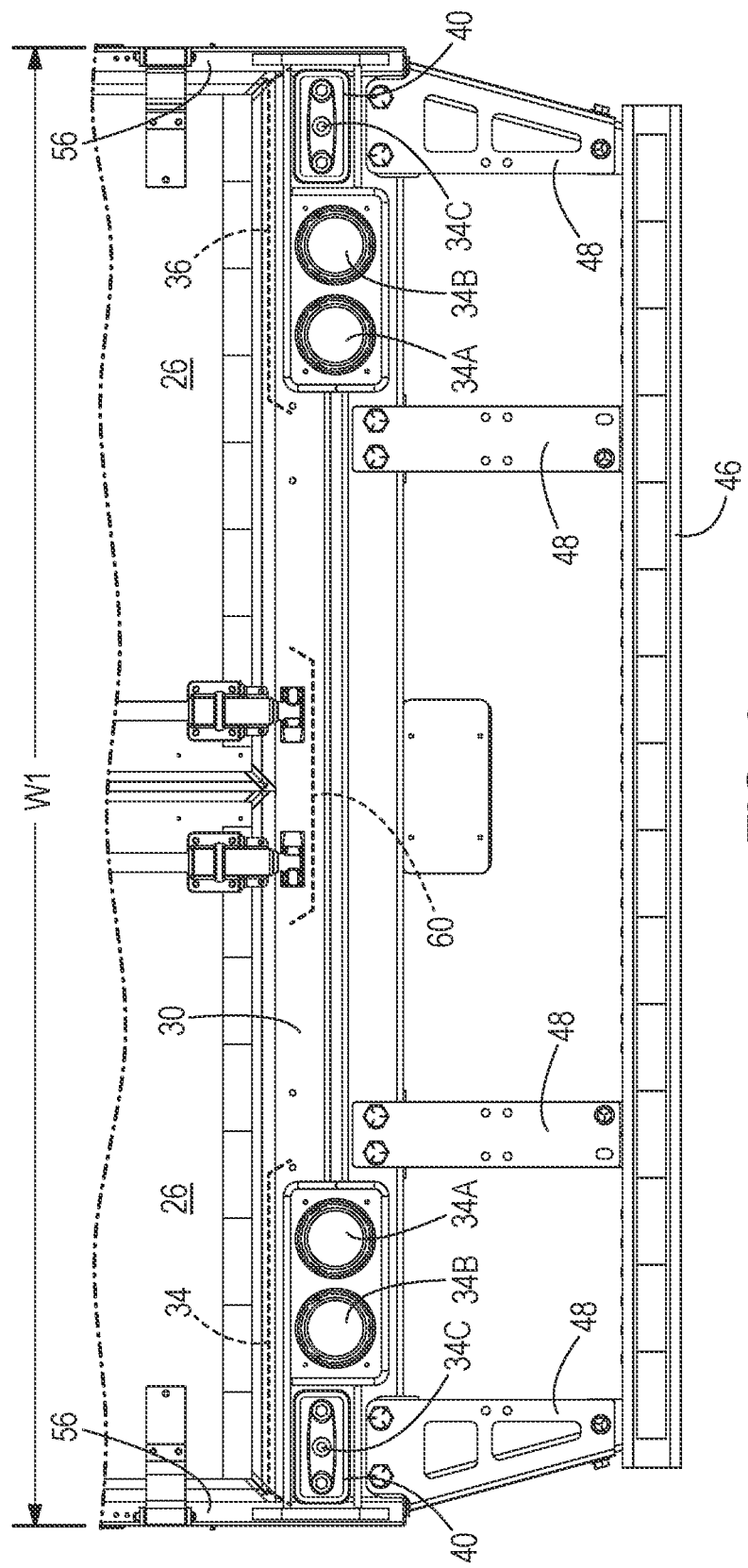
FIG. 3 is a rear elevation view of a lower portion of the cargo vehicle of FIGS. 1 and 2.

As shown in FIG. 2, the dock bumpers 40 can protrude rearward from the rear cross member 30. The dock bumpers 40 can extend further rearward than any other structure within the entire profile of the rear cross member 30. The dock bumpers 40 can define the two rearmost points of the entire cargo vehicle 20. The dock bumpers 40 function to reduce impact damage to the cargo vehicle 20 and/or loading dock during a docking event (e.g., where the cargo vehicle backs up to a loading dock for loading/unloading at a manufacturing facility, point of sale, etc.). The material of the dock bumper 40 can be polyurethane or rubber but may be any material that would meet the impact and durability requirements of docking contact. The dock bumpers 40 may be set as wide apart as possible on the cargo vehicle's overall width W1 (FIG. 1) to prevent damage where the vehicle 20 is backed up to the loading dock without precise alignment.

A rear impact guard 44 extends down from the rear cross member 30 and includes a horizontal bumper member 46 spaced below the rear cross member 30 by a plurality of posts 48. The rear cross member 30 can be constructed of metal (e.g., sheet) and can include a rear-facing panel in which the light arrays 34, 36 and the dock bumpers 40 are provided. With the exception of the configuration of the rear cross member 30, along with the light arrays 34, 36 and the dock bumpers 40, the cargo vehicle 20 may utilize recognizable construction techniques and features. Although many known cargo vehicles are known throughout the art, two recent examples can be found in U.S. Pat. No. 10,814,458 and U.S. Patent Application Publication No. 2022/0017156, the entire contents of both of which are incorporated by reference herein. It will be appreciated by those of skill in the art that the cargo vehicle 20, like those of the prior art, has defined front and rear ends at two opposite ends, defined top and bottom sides, along with a defined pair of opposed lateral or outboard sides, either referred to as the left and right sides, or "road" and "curb" sides. Directional references used herein generally conform to these guidelines.

Spaced above the rear cross member 30, adjacent top edges of the doors 26, the cargo vehicle 20 (except in the case of a flatbed) incudes a rear frame header 52 (FIG. 1). At each lateral or outboard edge, the header 52 and the rear cross member 30 are interconnected by a vertical rear frame post 56 extending therebetween. The doors 26 can be hinged to the rear frame posts 56 in some constructions. The rear frame posts 56 have bottom ends extending down to a bottom edge of the rear cross member 30. The overall width W1 of the cargo vehicle 20, at least at the rear end thereof, may be defined as the distance between opposite outside surfaces of the two rear frame posts 56. The overall width W1 is over 80 inches in some constructions. It will be appreciated from the above, and the drawings, that the rear cross member 30 serves one or more functions within the cargo vehicle 20. These can include spanning and interconnecting the lower ends of the rear frame posts 56, accommodating the light arrays 34, 36 and the dock bumpers 40, and providing mounting locations supporting at least a portion of the rear impact guard 44. In addition, latching structures 60 can be provided on a central widthwise portion of the rear cross member 30 to selectively maintain the doors 26 closed.

Figure 4:
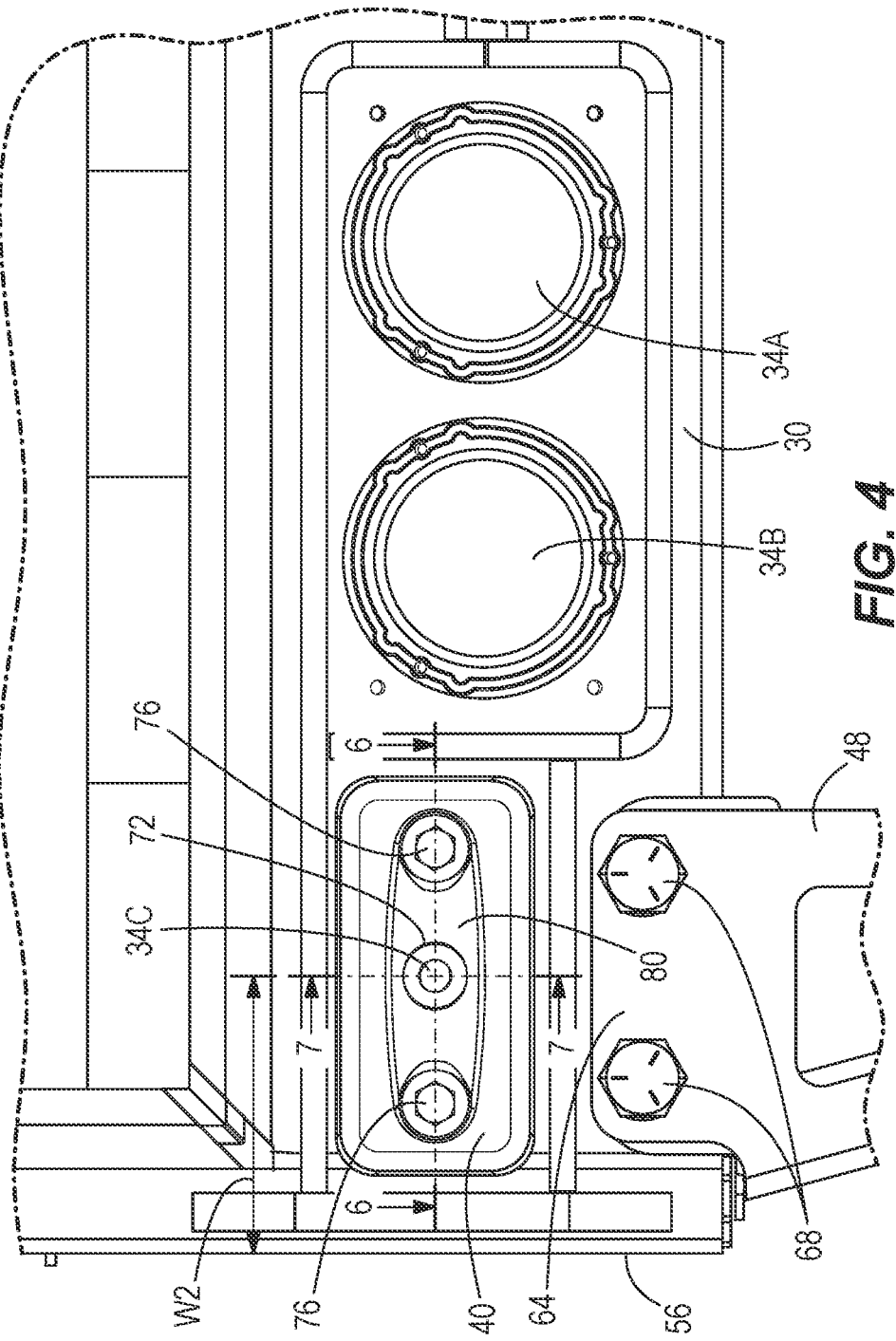
FIG. 4 is a detail view of a left end of a rear cross member including a lighting array as shown in FIG. 3, wherein a dock bumper encompasses one of the lamps of the lighting array.
Figure 5:
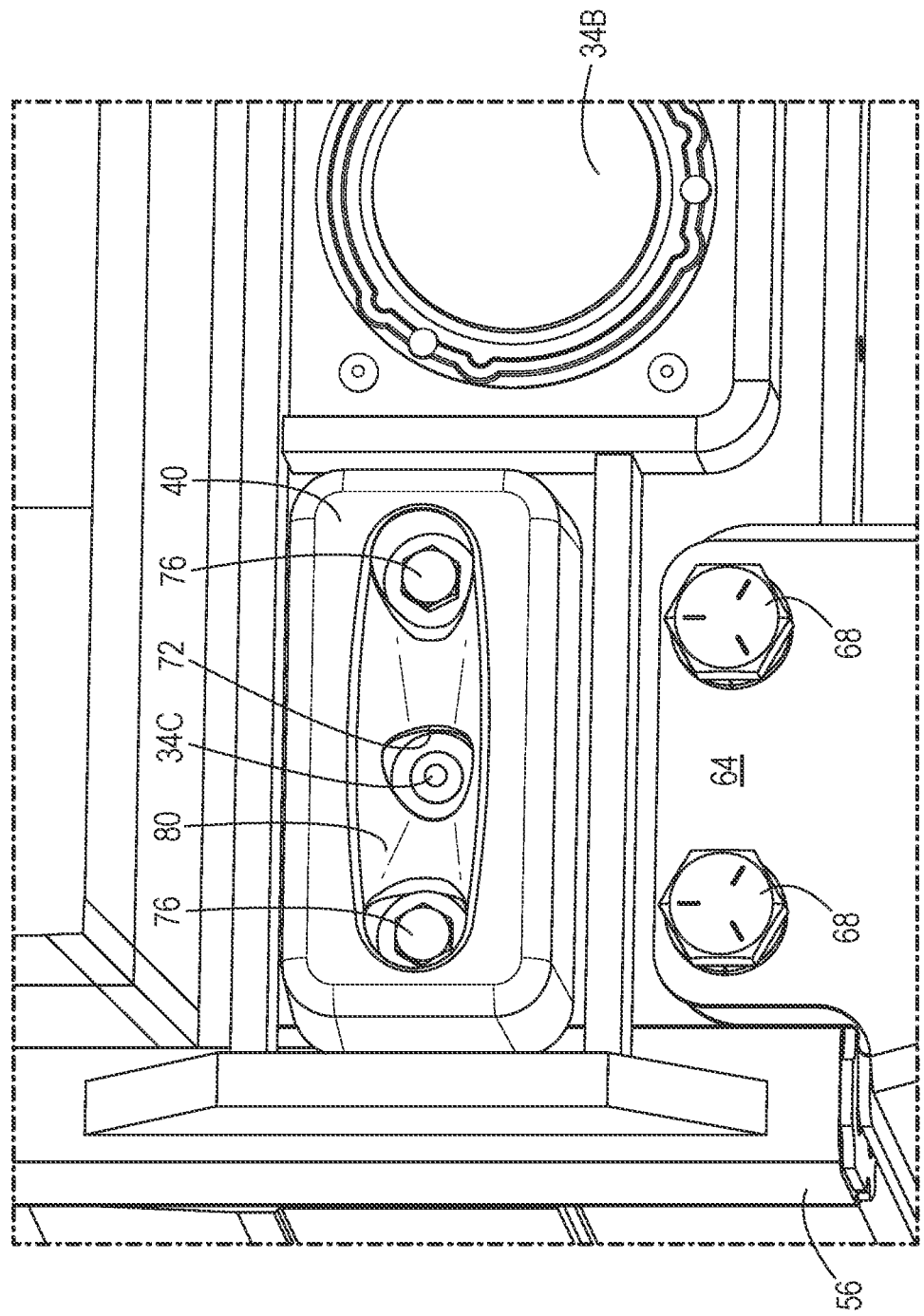
FIG. 5 is a perspective view of the dock bumper of FIGS. 4, taken from the left side and from below. The dock bumper is recessed to provide a direct view path of the encompassed lamp.

As best shown in FIG. 4, a lower-outboard corner of the rear cross member 30 is provided as a mounting location for one of the rear impact guard posts 48. The left or road side is shown, and it will be appreciated that the structure is mirrored on the right or curb side. A flat, rear-facing surface of the rear cross member 30 accommodates a mounting portion in the form of a mounting flange 64 of the rear impact guard post 48. The mounting flange 64 can be made up of one or more material sheets. The mounting flange 64 is positioned immediately inboard of the rear frame post 56. In rear view, the mounting flange 64 is directly below the dock bumper 40. The mounting flange 64 is securely fixed to the rear cross member 30, for example by one or more fasteners 68. In the illustrated construction, the fasteners 68 are bolts, and the bolts extend from the rear, through the mounting flange 64 and through the rear cross member 30.

Offset to the inboard side from the mounting flange 64 and the dock bumper 40, first and second lamps 34A, 34B of the first light array 34 are provided. The first and second lamps 34A, 34B can match each other in size and shape. In some constructions, the first and second lamps 34A, 34B are circular as viewed from the rear. The first and second lamps 34A, 34B can have an outer diameter, which in some constructions is over three inches (e.g., 4.5 inches). The first and second lamps 34A, 34B are in horizontal alignment with each other, defining a row. It can be seen from FIG. 4 that another lamp like the first and second lamps 34A, 34B cannot be provided at the outboard location where the dock bumper 40 and the mounting flange 64 are provided, as there is inadequate space. The first and second lamps 34A, 34B can meet federal vehicle regulations for taillights, including braking illumination function and turn indicator function. However, the first and second lamps 34A, 34B are positioned more than 6 inches inboard of the outboard edge of the cargo vehicle 20, and in some cases more than 9 inches. Therefore, regulations may require a separate clearance lamp somewhere on the cargo vehicle 20 outboard of the first and second lamps 34A, 34B. Clearance lamps fulfill the requirements of illuminating the cargo vehicle 20 to make its overall width W1 more visually identifiable. In some constructions clearance lamps may also have supplementary function(s), such as braking illumination and/or turn indicator function.

Where clearance lamps are not required in the rear frame header 52, clearance lamps may be instead provided in the rear cross member 30 (although it is also conceived to have clearance lamps in both the rear cross member 30 and the rear frame header 52 in some constructions). However, space is at a premium due to other competing demands, such as the demands to reduce the size of the rear cross member 30 (e.g., to maximize rear frame opening, and reduce weight). These demands generally drive the surface area to be minimized on the rear cross member 30. In spite of that, the illustrated construction provides a clearance lamp 34C outboard of the first and second lamps 34A, 34B at the same location as the dock bumper 40. In other words, the clearance lamp 34C and the dock bumper 40 are not offset but are instead overlapping as viewed from the rear. The clearance lamp 34C can also be described as being encompassed or enveloped by the dock bumper 40. The clearance lamp 34C can be centered within the dock bumper 40, or offset from center, as viewed from the rear. The clearance lamp 34C can be positioned so that its center is spaced a width W2 of 6 inches or less from the proximate outboard edge of the cargo vehicle 20. By having the rear clearance lamps 34C utilize the same area as the dock bumpers 40, advantages are provided in size, part number proliferation, and weight. This may be applicable to any vehicles that utilize a dock bumper. In the illustrated construction, the clearance lamps 34C have an outer diameter that is smaller than the outer diameter of the first and second lamps 34A, 34B. The clearance lamp outer diameter can be less than 3 inches, and in some constructions less than 2 inches. The clearance lamp outer diameter can be equal to or greater than 0.75 inch in some constructions. The clearance lamps 34C may include one or more LED elements or incandescent filaments. As described in further detail below, each clearance lamp 34C is mounted in and/or visible through a hole 72 in the corresponding dock bumper 40. The hole 72 is a through hole. Although the invention can encompass various positional relationships between the clearance lamp 34C and the hole 72 as described in further detail below, the hole 72 can be sized to provide clearance to accommodate all or at least a portion of the clearance lamp 34C.

Figure 6:
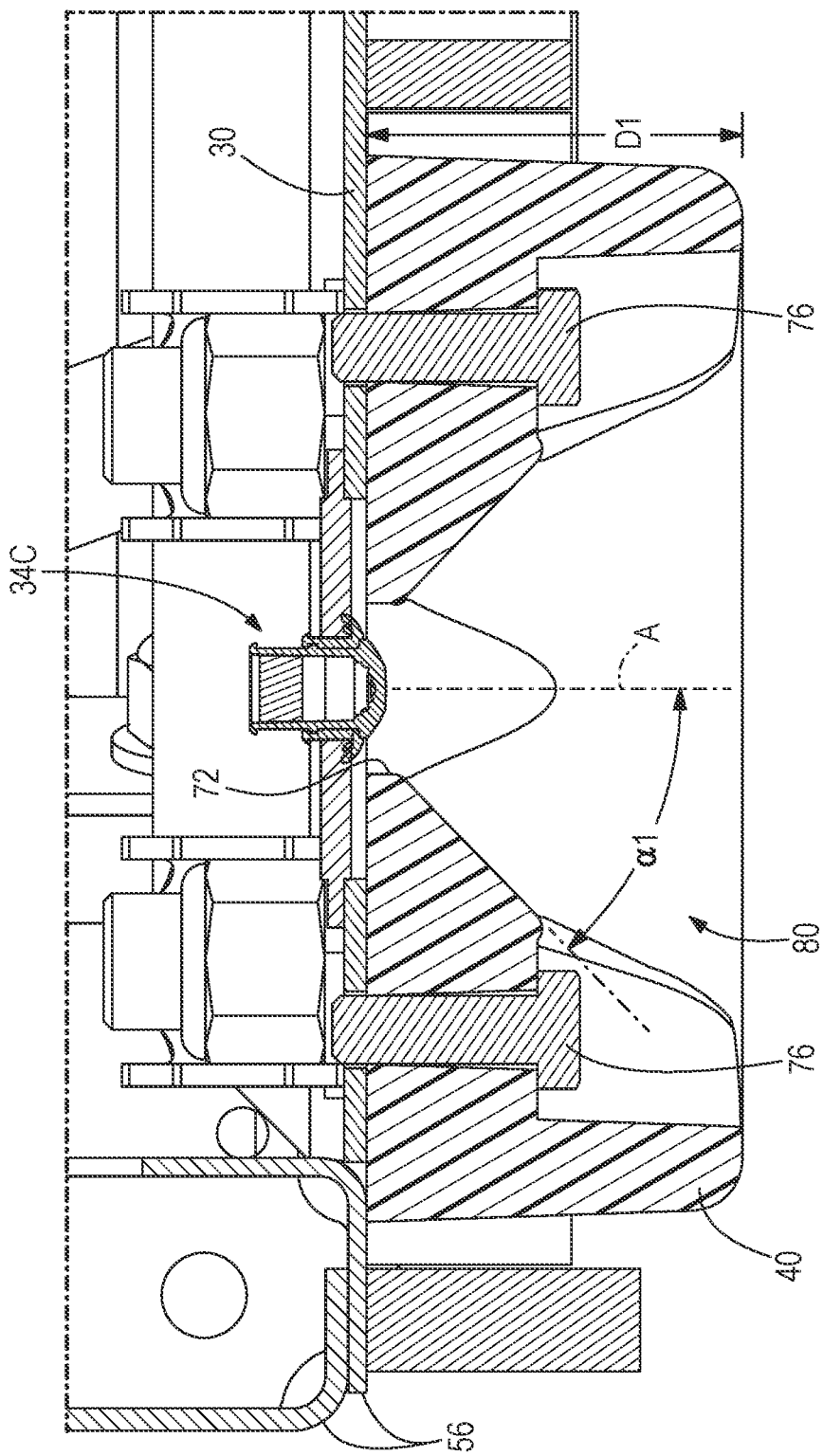
FIG. 6 is a cross-section through the dock bumper, taken along line 6-6 of FIG. 4.
Figure 7:
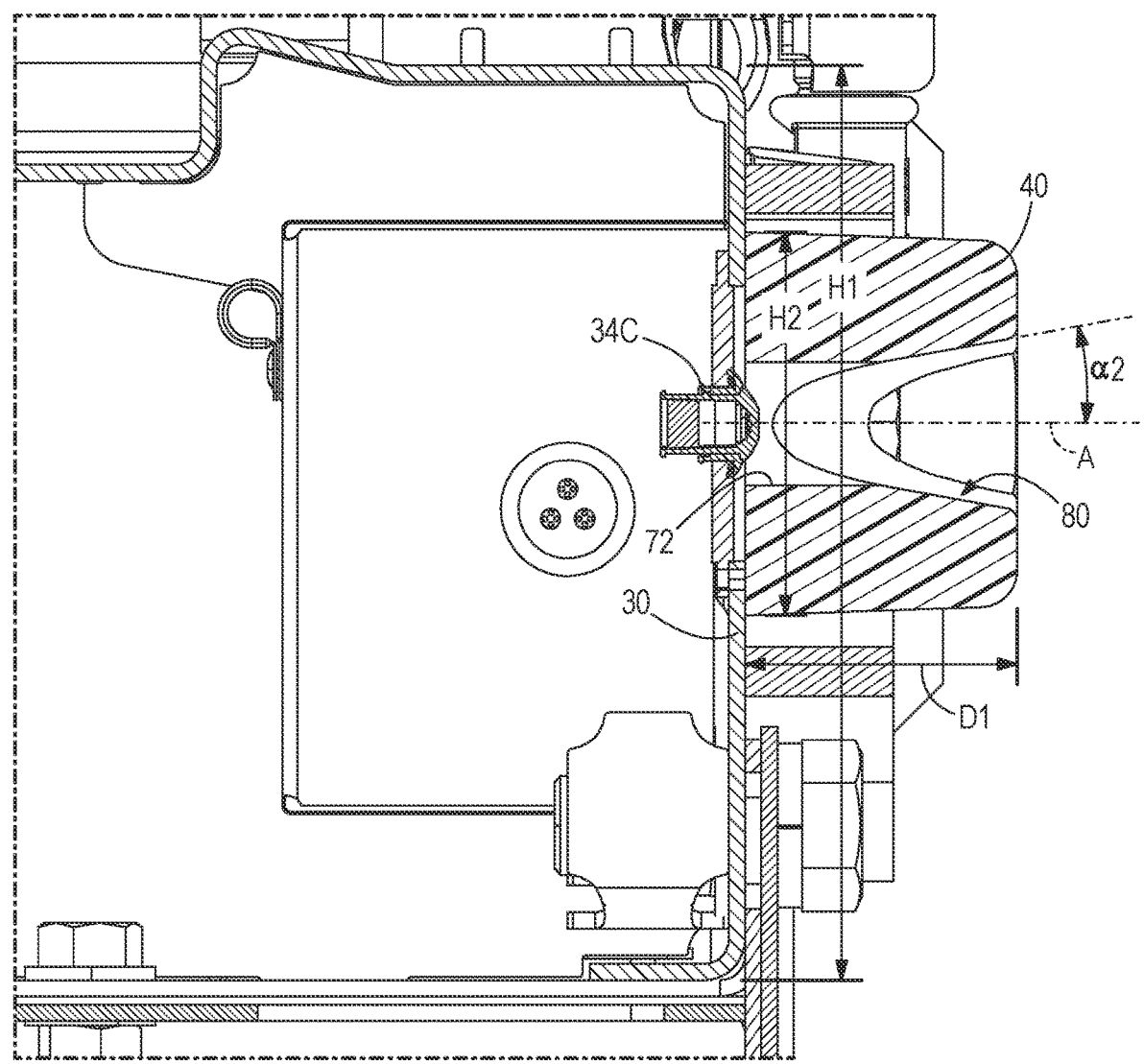
FIG. 7 is a cross-section through the dock bumper, taken along line 7-7 of FIG. 4.

In the illustrated construction, each dock bumper 40 has an outer dimension in the horizontal widthwise direction of the cargo vehicle 20 that is larger than an outer dimension in the vertical height direction of the cargo vehicle 20. The dock bumper 40 can have a rectangular shape in rear view (e.g., including rounded corners), although other regular and irregular shapes are optional. The dock bumper 40 is mounted to the rear cross member 30 with fasteners, which in the illustrated construction include two horizontally- or widthwise-spaced fasteners 76 (e.g., threaded fasteners such as bolts or screws). The fasteners 76 can extend parallel to the fasteners 68 through a vertical rear panel of the rear cross member 30. The fasteners 76 can be recessed inwardly from a rearmost dock engagement surface of the dock bumper 40, which includes a recess (or "pocket," "cavity") 80 that extends to the through hole 72. In other words, the fasteners 76 are countersunk. The recess 80 can have a concave surface shape that converges toward the through hole 72. The surface of the recess 80 can be conical in cross-section as shown in FIGS. 6 and 7. However, the surface of the recess 80 can be defined by different cone angles $\alpha 1$, $\alpha 2$ in the horizontal (FIG. 6) and vertical (FIG. 7) directions, respectively. The cone angles $\alpha 1$, $\alpha 2$ are measured from a central axis A of the clearance lamp 34C, which is also a central axis of the dock bumper 40 and the through hole 72 therein in the illustrated construction. The central axis A can be the central illumination axis for visible light emitted from the light emitting element(s) within the clearance lamp 34C. The horizontal and vertical cone angles $\alpha 1$, $\alpha 2$ can merge smoothly together to define a surface that generally approximates an elliptic cone. In combination with the overall depth D1 of the dock bumper 40 and the placement of the clearance lamp 34C in relation to the dock bumper 40, the horizontal and vertical cone angles $\alpha 1$, $\alpha 2$ can ensure a direct line of sight to the clearance lamp 34C from an offset horizontal angle of at least 45 degrees (in both horizontal directions) as well as a direct line of sight to the clearance lamp 34C from an offset vertical angle of at least 10 degrees. As can be appreciated, rearward movement of the clearance lamp 34C and/or expanding the size of the through hole 72 can enable the above stated visibility requirements to be met with less cone angle (or no cone angle) in other constructions.

Although the clearance lamp 34C is circular in rear view, and the through hole 72 in the dock bumper 40 is likewise circular (and slightly oversized for the clearance lamp 34C), it is also conceived to have a non-circular clearance lamp configured to shine through the dock bumper. For example, an elliptical, rectangular (e.g., square), hexagonal, octagonal, or other polygonal or irregular shaped clearance lamp can be provided. The through hole 72 in the dock bumper 40 can have a corresponding shape, or remain circular, or even have another mismatching shape with respect to the clearance lamp. As best shown in FIGS. 6 and 7, a most rearward portion of the clearance lamp 34C extends inside the dock bumper 40 into overlapping position with the through hole 72. In other words, the clearance lamp 34C extends rearward past a forward-most side of the dock bumper 40 that faces and adjoins with the rear cross member 30. A majority of the clearance lamp 34C remains outside the dock bumper 40 and forward thereof (toward the top of FIG. 6, and toward the left of FIG. 7). In other constructions, the clearance lamp 34C can be positioned to extend further rearward into the dock bumper 40 for greater overlap therewith (e.g., and in some cases entirely within the dock bumper 40). In yet other constructions, the clearance lamp 34C is situated further forward to have no overlap with the dock bumper 40, despite being visible on a direct line of sight through the dock bumper 40. The clearance lamp 34C is mounted to a forward-facing interior side of the rear cross member 30, and the dock bumper 40 does not touch or support the clearance lamp 34C.

As can be seen from FIG. 4, the dock bumper 40 occupies a majority of the horizontal widthwise space between the outboard side of the rear frame post 56 and the nearest adjacent lamp 34B of the light array that is not the clearance lamp 34C. FIG. 6 illustrates how an outboard portion of the dock bumper 40 extends outboard past an outboard edge of the rear cross member 30 and onto a portion of the rear frame post 56. The rear cross member 30 has a height H1 (FIG. 7) as measured at the vertical rear panel thereof. As mentioned above, the rear cross member 30 can be downsized compared to conventional practice. The height H1 can be less than 10 inches in some constructions. Furthermore, the dock bumper height H2, despite being smaller in some constructions than the width of the dock bumper 40, can be at least 33 percent of the rear cross member height H1.

Various features and advantages of the invention are set forth in the following claims.

What is claimed is:
1. A cargo vehicle comprising:
   a cargo area configured to receive a load of cargo for transport;
   a plurality of wheels configured to support the cargo area above a road surface while the plurality of wheels roll along the road surface;
   a rear structure including a rear cross member located at a rear edge of the cargo area;
   a first light array located in the rear cross member; and
   a first dock bumper placed directly over a first lamp of the first light array on a first lateral side of the rear cross member, wherein the first dock bumper includes a through hole accommodating the first lamp to visually mark a first outboard edge of the cargo vehicle,
   wherein a concave recess in the first dock bumper converges toward the through hole, the concave recess providing line of sight to the first lamp from +/−45 degrees horizontal offset from directly rearward and +/−10 degrees vertical offset from directly rearward.

2. The cargo vehicle of claim 1, wherein the cargo vehicle is a dry van, a reefer, a flatbed, or a straight truck.

3. The cargo vehicle of claim 1, wherein the first lamp is within 6 inches of the first outboard edge.

4. The cargo vehicle of claim 1, wherein the through hole in the first dock bumper has a circular cross-section.

5. A cargo vehicle comprising:
   a cargo area configured to receive a load of cargo for transport;
   a plurality of wheels configured to support the cargo area above a road surface while the plurality of wheels roll along the road surface;
   a rear structure including a rear cross member located at a rear edge of the cargo area;
   a first light array located in the rear cross member; and
   a first dock bumper placed directly over a first lamp of the first light array on a first lateral side of the rear cross member, wherein the first dock bumper includes a through hole accommodating the first lamp to visually mark a first outboard edge of the cargo vehicle,
   wherein the first light array includes at least second and third lamps positioned inboard of the first lamp and configured to provide taillight, braking, and turn indicator functions, and wherein the first lamp has a smaller rearview area than each of the second and third lamps.

6. A cargo vehicle comprising:
   a cargo area configured to receive a load of cargo for transport;
   a plurality of wheels configured to support the cargo area above a road surface while the plurality of wheels roll along the road surface;

a rear structure including a rear cross member located at a rear edge of the cargo area;
a first light array located in the rear cross member; and
a first dock bumper placed directly over a first lamp of the first light array on a first lateral side of the rear cross member, wherein the first dock bumper includes a through hole accommodating the first lamp to visually mark a first outboard edge of the cargo vehicle,
wherein the first lamp is mounted to a forward-facing interior side of the rear cross member, and the first dock bumper does not touch or support the first lamp.

7. The cargo vehicle of claim 1, further comprising a second dock bumper placed directly over a second lamp of a second light array on a second lateral side of the rear cross member, wherein the second dock bumper includes a through hole accommodating the second lamp to visually mark a second outboard edge of the cargo vehicle.

8. The cargo vehicle of claim 7, wherein the first and second dock bumpers are mounted, respectively, directly above attachment points at which rear impact guard posts are attached to the rear cross member.

9. The cargo vehicle of claim 1, wherein a vertical rear panel of the rear cross member that accommodates the first light array and the first dock bumper has a height of less than 10 inches.

10. The cargo vehicle of claim 9, wherein a height of the first dock bumper is at least 33 percent of the height of the vertical rear panel of the rear cross member.

11. A cargo vehicle comprising:
a cargo area configured to receive a load of cargo for transport;
a plurality of wheels configured to support the cargo area above a road surface while the plurality of wheels roll along the road surface;
a rear structure including a rear cross member located at a rear edge of the cargo area;
a first dock bumper placed within 6 inches of a left outboard edge of the cargo vehicle;
a first clearance lamp positioned within an outer profile of the first dock bumper when viewed from the rear of the cargo vehicle;
a second dock bumper placed within 6 inches of a right outboard edge of the cargo vehicle;
a second clearance lamp positioned within an outer profile of the second dock bumper as viewed from the rear of the cargo vehicle; and
a rear impact guard extending downward from and mounted to the rear cross member, wherein the first and second dock bumpers are mounted, respectively, directly above mounting portions of the rear impact guard that are secured to the rear cross member,
wherein the rear cross member includes a vertical rear panel to which both the first and second dock bumpers are attached with respective first fasteners, and wherein the mounting portions of the rear impact guard are secured to the rear cross member with respective second fasteners that extend parallel to the first fasteners through the vertical rear panel.

12. The cargo vehicle of claim 11, further comprising a rear frame header spaced above the rear cross member, the rear frame header having no clearance lamps.

13. The cargo vehicle of claim 11, wherein each of the first and second dock bumpers has a height that is at least 33 percent of a height of a vertical rear panel of the rear cross member.

14. The cargo vehicle of claim 11, wherein the first and second dock bumpers include respective through holes accommodating at least a portion of the respective first and second clearance lamps.

15. A cargo vehicle comprising:
a cargo area configured to receive a load of cargo for transport;
a plurality of wheels configured to support the cargo area above a road surface while the plurality of wheels roll along the road surface;
a rear structure including a rear cross member located at a rear edge of the cargo area;
a first dock bumper placed within 6 inches of a left outboard edge of the cargo vehicle;
a first clearance lamp positioned within an outer profile of the first dock bumper when viewed from the rear of the cargo vehicle;
a second dock bumper placed within 6 inches of a right outboard edge of the cargo vehicle;
a second clearance lamp positioned within an outer profile of the second dock bumper as viewed from the rear of the cargo vehicle; and
a rear impact guard extending downward from and mounted to the rear cross member, wherein the first and second dock bumpers are mounted, respectively, directly above mounting portions of the rear impact guard that are secured to the rear cross member,
wherein the first and second dock bumpers include respective through holes accommodating at least a portion of the respective first and second clearance lamps,
wherein a concave recess in the first dock bumper converges toward the through hole therein, the concave recess providing line of sight to the first clearance lamp from +/−45 degrees horizontal offset from directly rearward and +/−10 degrees vertical offset from directly rearward, and
wherein a concave recess in the second dock bumper converges toward the through hole therein, the concave recess providing line of sight to the first clearance lamp from +/−45 degrees horizontal offset from directly rearward and +/−10 degrees vertical offset from directly rearward.

16. The cargo vehicle of claim 11, wherein
the first dock bumper occupies a majority of the horizontal widthwise space between the left outboard edge of the cargo vehicle and a nearest adjacent lamp within the rear cross member that is not the first clearance lamp, and
the second dock bumper occupies a majority of the horizontal widthwise space between the right outboard edge of the cargo vehicle and a nearest adjacent lamp within the rear cross member that is not the second clearance lamp.

17. A cargo vehicle comprising:
a cargo area configured to receive a load of cargo for transport;
a plurality of wheels configured to support the cargo area above a road surface while the plurality of wheels roll along the road surface;
a rear structure including a rear cross member located at a rear edge of the cargo area;
a first dock bumper placed within 6 inches of a left outboard edge of the cargo vehicle;
a first clearance lamp positioned within an outer profile of the first dock bumper when viewed from the rear of the cargo vehicle;

a second dock bumper placed within 6 inches of a right outboard edge of the cargo vehicle;
a second clearance lamp positioned within an outer profile of the second dock bumper as viewed from the rear of the cargo vehicle; and
a rear impact guard extending downward from and mounted to the rear cross member, wherein the first and second dock bumpers are mounted, respectively, directly above mounting portions of the rear impact guard that are secured to the rear cross member,
wherein the first clearance lamp is part of a left light array that includes at least a pair of additional lamps positioned inboard of the first clearance lamp and configured to provide taillight, braking, and turn indicator functions, and wherein the first clearance lamp has a smaller rearview area than each of the pair of additional lamps in the left light array, and
wherein the second clearance lamp is part of a right light array that includes at least a pair of additional lamps positioned inboard of the second clearance lamp and configured to provide taillight, braking, and turn indicator functions, and wherein the second clearance lamp has a smaller rearview area than each of the pair of additional lamps in the right light array.

18. The cargo vehicle of claim 11, wherein the cargo vehicle is a dry van, a reefer, a flatbed, or a straight truck.

19. The cargo vehicle of claim 5, further comprising a rear frame header spaced above the rear cross member, the rear frame header having no clearance lamps.

20. The cargo vehicle of claim 6, further comprising a rear frame header spaced above the rear cross member, the rear frame header having no clearance lamps.

* * * * *